(12) United States Patent
Zhang (10) Patent No.: US 10,220,823 B2
(45) Date of Patent: Mar. 5, 2019

(54) BRAKE BOOSTER (71) Applicant: ROBERT BOSCH GMBH, Stuttgart (DE)

(72) Inventor: Qiusheng Zhang, Stuttgart (DE)

(73) Assignees: Bosch Automotive Products (Suzhou) Co., Ltd., Suzhou, Jiangsu (CN); Robert Bosch GmbH, Stuttgart (DE)

( * ) Notice: Subject to any disclaimer, the term of this patent is extended or adjusted under 35 U.S.C. 154(b) by 711 days.

(21) Appl. No.: 14/442,343

(22) PCT Filed: Oct. 23, 2013

(86) PCT No.: PCT/CN2013/085753
§ 371 (c)(1),
(2) Date: May 12, 2015

(87) PCT Pub. No.: WO2014/075541
PCT Pub. Date: May 22, 2014

(65) Prior Publication Data
US 2016/0272184 A1    Sep. 22, 2016

(30) Foreign Application Priority Data

Nov. 13, 2012 (CN) .......................... 2012 1 0452770

(51) Int. Cl.
B60T 13/74 (2006.01)
B60T 7/04 (2006.01)
(52) U.S. Cl.
CPC ............ B60T 13/745 (2013.01); B60T 7/042 (2013.01)
(58) Field of Classification Search
CPC ............................... B60T 7/042; B60T 13/745
See application file for complete search history.

(56) References Cited

U.S. PATENT DOCUMENTS 3,908,862 A * 9/1975 Chandra ............... B29B 7/7626
222/134
6,516,701 B1   2/2003 Drott et al.
(Continued)

FOREIGN PATENT DOCUMENTS

CN       1872599 A    12/2006
CN     101980907 A     2/2011
(Continued)

OTHER PUBLICATIONS

International Search Report corresponding to PCT Application No. PCT/CN2013/085753, dated Feb. 20, 2014 (Chinese and English language document) (6 pages).

*Primary Examiner* — F. Daniel Lopez
*Assistant Examiner* — Michael Quandt
(74) *Attorney, Agent, or Firm* — Maginot, Moore & Beck LLP (57) ABSTRACT

A brake booster for a vehicle brake system includes a brake force transmitting element, a booster force transmitting element, a first rotation sensor, and a second rotation sensor. The brake force transmitting element is moveable in an axial direction for transmitting a pedal brake force from a brake pedal to a primary brake cylinder. The booster force transmitting element is moveable in the axial direction for transmitting a booster brake force to the primary brake cylinder. The first rotation sensor is kinematically coupled with the brake force transmitting element via a motion converting mechanism for measuring the axial position of the brake force transmitting element. The second rotation sensor is kinematically coupled with the booster force transmitting element for measuring the axial position of the booster force transmitting element. The measurements of the first and second rotation sensors are used for controlling the generation of the booster brake force.

15 Claims, 5 Drawing Sheets

(56) References Cited

U.S. PATENT DOCUMENTS

| | | | | |
|---|---|---|---|---|
| 6,634,724 B2 * | 10/2003 | Kobayashi | ............ | B60T 8/3265 |
| | | | | 188/1.11 E |
| 7,750,625 B2 * | 7/2010 | Wolschlager | .......... | G01D 5/145 |
| | | | | 324/207.24 |
| 8,818,672 B2 * | 8/2014 | Takeda | .................. | B60T 13/745 |
| | | | | 303/10 |
| 2010/0026083 A1 * | 2/2010 | Leiber | ..................... | B60T 7/042 |
| | | | | 303/3 |
| 2010/0062897 A1 | 3/2010 | Nishino et al. | | |
| 2010/0242469 A1 | 9/2010 | Jungbecker et al. | | |
| 2010/0326072 A1 | 12/2010 | Ishii et al. | | |
| 2011/0074209 A1 | 3/2011 | Ueno | | |
| 2011/0297493 A1 * | 12/2011 | Vollert | .................... | B60T 7/042 |
| | | | | 188/106 R |
| 2012/0073285 A1 | 3/2012 | Sakuma | | |
| 2012/0073286 A1 | 3/2012 | Takayama et al. | | |

FOREIGN PATENT DOCUMENTS

| | | | | |
|---|---|---|---|---|
| CN | 102029995 A | 4/2011 | | |
| DE | 10 2010 046 835 A1 | 5/2011 | | |
| JP | 2005-321031 A | 11/2005 | | |
| JP | 2006-213080 A | 8/2006 | | |
| JP | 2007-191133 A | 8/2007 | | |
| JP | 2011-73532 A | 4/2011 | | |
| JP | WO 2012118103 A1 * | 9/2012 | ............ | B60T 13/745 |
| KR | 1020080008803 A | 1/2008 | | |

\* cited by examiner

BRAKE BOOSTER

This application is a 35 U.S.C. § 371 National Stage Application of PCT/CN2013/085753, filed on Oct. 23, 2013, which claims the benefit of priority to Serial No. CN 201210452770.0, filed on Nov. 13, 2012 in China, the disclosures of which are incorporated herein by reference in their entirety.

TECHNICAL FIELD

The disclosure relates to a brake booster, in particular an electric brake booster, to be used in a vehicle brake system.

BACKGROUND ART

A vehicle generally comprises a hydraulic brake system for reducing the speed of the vehicle and/or for stopping the vehicle. It needs great effort for manipulating a brake pedal by the driver, so in many vehicles, a brake booster is added in addition to the hydraulic brake device of the hydraulic brake system.

Traditional brake boosters mainly comprise vacuum brake boosters, in which the vacuum in an inlet pipe of an engine is used as a source of booster brake force which generates a vacuum booster force, in the level of several times higher than the pedal brake force, to be applied to a primary brake cylinder. In this way, the primary brake cylinder receives both the pedal brake force and the vacuum booster force, so that the output pressure of the primary brake cylinder is increased, and thus the pedal brake force needed for vehicle braking can be decreased.

The operation of the engine is affected by the operation of the vacuum brake booster since the booster brake force is generated by the vacuum brake booster using the vacuum in the inlet pipe of the engine. Further, after the engine is shut off, no inlet vacuum exists, and thus no booster brake force can be generated.

As a substitution of the vacuum brake booster, an electric brake booster is developed, which drives a booster force transmitting element by an electric motor to generate a booster brake force, independent of the vacuum in the inlet pipe of the engine.

In an electric brake booster, the action of the electric motor shall be coordinated with the action of the brake pedal. For this purpose, sensors are used for sensing the motions of the electric motor and the brake pedal. In general, the electric motor has its own rotor-rotation sensor for monitoring the movement of the electric motor. In addition, a stroke sensor is used for monitoring the displacement of the brake pedal or the displacement of a brake element driven by the brake pedal.

In such an electric brake booster, it is not easy to provide a measurement with high precision by the stroke sensor. Meanwhile, the stroke sensor has low robustness and is easy to be affected by environment factors, like magnetic field, contamination and icing. Further, the stroke sensor is relative expensive.

SUMMARY OF THE DISCLOSURE

The disclosure is aimed at solving one or more problems found in the brake booster according to prior art.

For this end, according to one aspect of the disclosure, there provides a brake booster to be used in a vehicle brake system, the brake booster comprising a brake force transmitting element configured to be moveable in an axial direction for transmitting a pedal brake force from a brake pedal to a primary brake cylinder of the vehicle, a booster force transmitting element configured to be moveable in the axial direction for transmitting a booster brake force to the primary brake cylinder, a first rotation sensor kinematically coupled with the brake force transmitting element via a motion converting mechanism, which is configured for converting a translational motion into a rotational motion, for measuring the axial position of the brake force transmitting element, and a second rotation sensor kinematically coupled with the booster force transmitting element for measuring the axial position of the booster force transmitting element; wherein the measurements of the first and second rotation sensors are used for controlling the generation of the booster brake force.

According to a preferred embodiment of the disclosure, the brake booster further comprises an electric motor for generating the booster brake force.

According to a preferred embodiment of the disclosure, the electric motor drives the booster force transmitting element via a transmission mechanism which is configured for converting a rotational motion into a translational motion.

According to a preferred embodiment of the disclosure, the electric motor comprises a rotation motor or a linear motor.

According to a preferred embodiment of the disclosure, the second rotation sensor comprises a rotor-rotation sensor of the electric motor.

According to a preferred embodiment of the disclosure, the brake booster further comprises an electronic control unit which controls the generation of the booster brake force based on the measurements of the first and second rotation sensors, in particular, by controlling the operation of the electric motor.

According to a preferred embodiment of the disclosure, the motion converting mechanism comprises a toothed rack coupled with the brake force transmitting element in a way of being able to move in the axial direction together with the brake force transmitting element, and a sensor gear adapted to be driven by the toothed rack to generate a rotational motion which can be sensed by the first rotation sensor.

According to a preferred embodiment of the disclosure, the toothed rack is carried by the booster force transmitting element and is able to move in the axial direction with respect to the booster force transmitting element.

According to a preferred embodiment of the disclosure, the first rotation sensor comprises a sensor magnet carried by the sensor gear and a sensing element which is able to sense the change in the magnetic field of the sensor magnet.

According to a preferred embodiment of the disclosure, the booster force transmitting element comprises a hollow valve body extending in the axial direction, and the brake force transmitting element comprises a plunger to be driven forwards by the brake pedal via a push bar, the plunger being configured to be axially movable in the valve body.

According to a preferred embodiment of the disclosure, the brake force transmitting element is coupled with the motion converting mechanism by a locating pin.

According to a preferred embodiment of the disclosure, the locating pin is arranged to be able to move a limited distance in the axial direction with respect to the booster force transmitting element.

According to a preferred embodiment of the disclosure, the brake booster further comprises a brake force outputting element configured to transmit the pedal brake force and the booster brake force to a primary piston of the primary brake cylinder.

According to a preferred embodiment of the disclosure, the brake booster further comprises a returning element, such as a returning spring, for applying a returning force to the booster force transmitting element, under the action of which the booster force transmitting element tends to move backwards in the axial direction.

According to the disclosure, rotation sensors are used for sensing the positions and movements of the brake force transmitting element and the booster force transmitting element, so that sensing of axial position with high precision can be achieved.

Further, the rotation sensors can provide higher signal stability since the rotation sensors are less affected by the direction and intensity of a magnetic field.

Further more, the performance of the rotation sensors does not become degenerated severely when they are contaminated with outside materials, like dust, oil and ice, and thus the rotation sensors have high robustness.

Still Further, the rotation sensors are not expensive, which helps to reduce the overall cost of the brake booster.

According to the disclosure, the electronic control unit is able to accurately control the operation of the electric motor on the basis of the sensed signals from the rotation sensors, so that the action of the brake booster can be actively controlled with high precision in real time.

DETAILED DESCRIPTION OF PREFERRED EMBODIMENTS

Now some preferred embodiments of the disclosure will be described with reference to the drawings.

It is noted that the drawings are provided only for schematically illustrating some possible embodiments of the brake booster of the disclosure, and thus the components of the brake booster are not drawn to scale.

It is also noted that the term "proximal" or "backward" refer to the side proximal to the brake pedal of the vehicle, while the term "distal" or "forward" refer to the side distal from the brake pedal and proximal to the primary brake cylinder of the wheels.

Figure 1:
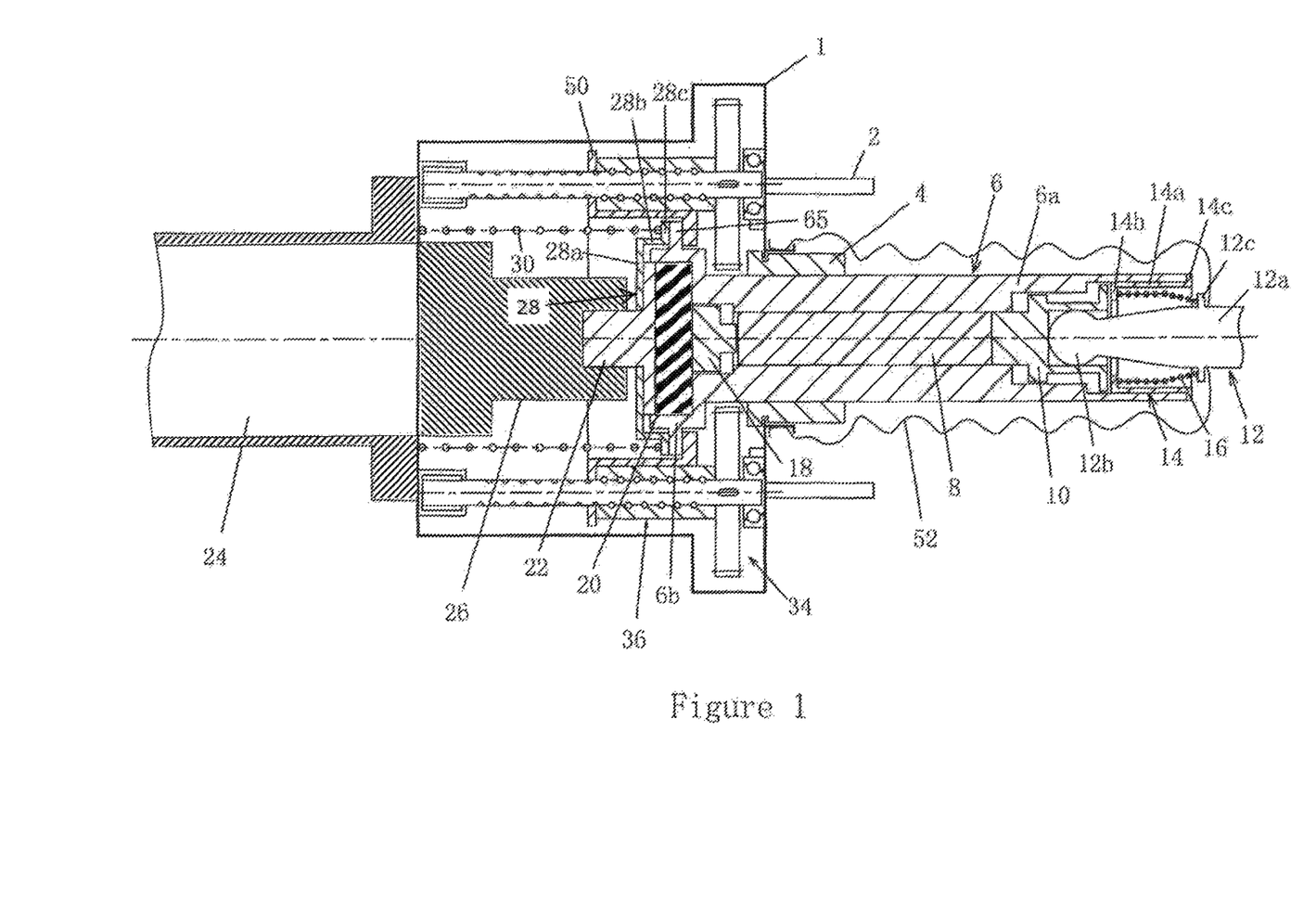
FIG. 1 is a sectional front view of a vehicle brake booster according to a possible embodiment of the disclosure in an unbraking state.
Figure 2:
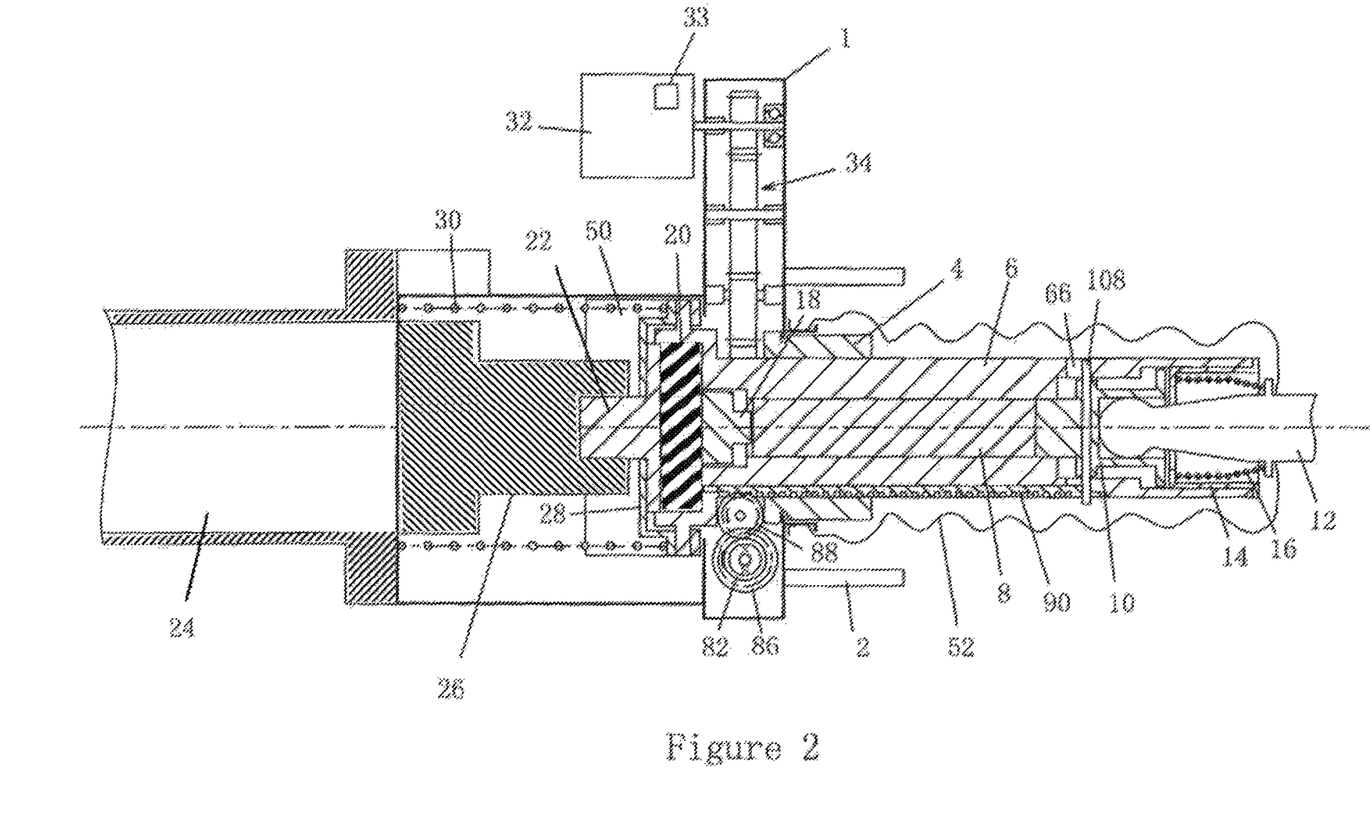
FIG. 2 is a sectional top view of the brake booster shown in FIG. 1 in the unbraking state.

As shown in FIGS. 1 and 2, according to a preferred embodiment of the disclosure, a brake booster to be used in a vehicle brake system comprises a housing 1 which can be formed of any suitable materials, such as sheet metal or plastic.

The housing 1 can be mounted to the vehicle body by means of any suitable fastening device, for example, using tie bars 2 shown in FIG. 1. Of course, other suitable fastening devices or structures can alternatively be used for fixing the housing 1 to the vehicle body.

The housing 1 fixedly carries a valve body guider 4 which can be formed of metal, rubber or plastic material. The valve body guider 4 defines therein an internal guiding space which extends through the valve body guider 4 in an axial direction. The valve body guider 4 is mounted to a side of the housing 1 which faces towards the brake pedal, and is partly within the housing 1 and partly outside the housing 1.

A valve body 6, which forms a booster force transmitting element of the brake booster, comprises a substantially cylindrical body portion 6a extending in the axial direction and an urging portion 6b formed on the distal end of the body portion 6a. The two portions may be formed integrally, or be formed separately and then assembled together.

The body portion 6a extends through the internal guiding space of the valve body guider 4 and is guided by the valve body guider 4 to be able to move in the axial direction. A proximal end portion of the body portion 6a is exposed outside the housing 1, and a distal end portion of the body portion 6a and the urging portion 6b are located in the housing 1.

Further, the body portion 6a is prevented from rotating around its central axis in the valve body guider 4. For this purpose, a locating element (not shown), such as a key or a guiding pin, can be arranged between the body portion 6a and the valve body guider 4.

Figure 5:
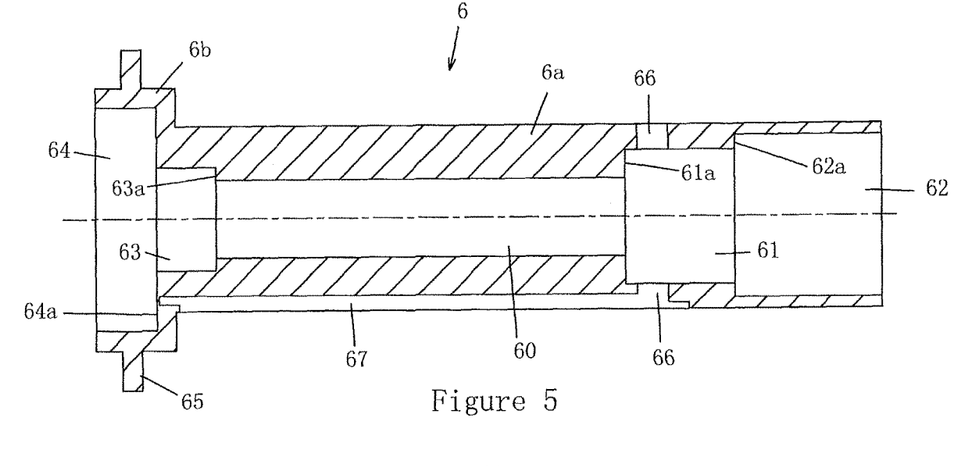
FIG. 5 is an enlarged sectional view of a valve body used in the brake booster shown in FIG. 1.

The valve body 6 defines therein a plurality of accommodating spaces in the axial direction, as more clearly shown in FIG. 5. These accommodating spaces comprise a middle through hole 60 extending in the axial direction, a first accommodating socket 61 extending backwards from the proximal end of the middle through hole 60 and having a diametric dimension (for example, diameter) larger than that of the middle through hole 60 so that a first step 61a facing towards the proximal side is formed therebetween, a second accommodating socket 62 extending backwards from the proximal end of the first accommodating socket 61 and having a diametric dimension larger than that of the first accommodating socket 61 so that a second step 62a facing towards the proximal side is formed therebetween, a third accommodating socket 63 extending forwards from the distal end of the middle through hole 60 and having a diametric dimension larger than that of the middle through hole 60 so that a third step 63a facing towards the distal side is formed therebetween, and a fourth accommodating socket 64 extending forwards from the distal end of the third accommodating socket 63 and having a diametric dimension larger than that of the third accommodating socket 63 so that a fourth step 64a facing towards the distal side is formed therebetween. The middle through hole 60, the first accommodating socket 61, the second accommodating socket 62 and the third accommodating socket 63 are formed in the body portion 6a, and the fourth accommodating socket 64 is formed in the urging portion 6b. The urging portion 6b has a diametric dimension preferably larger than that of the body portion 6a so that the fourth accommodating socket 64 has a diametric dimension which is sufficiently large, even larger than the diametric dimension of the outer periphery of the body portion 6a.

Further, a circular flange 65 is formed around the outer periphery of the urging portion 6b, a pair of diametrically opposed through holes 66 are formed in the body portion 6a, extending from the outer periphery of the body portion 6a to the first accommodating socket 61 in a diametric direction, and a rack receiving socket 67 is formed in one side of the outer periphery of the body portion 6a, extending in the axial direction. The functions of these portions will be described later.

A plunger rod 8 is disposed in the middle through hole 60 of the valve body 6 in an axially movable manner, the plunger rod 8 being biased at its proximal end by the plunger 10 towards the distal side.

In the illustrated embodiment, the plunger rod 8 and the plunger 10 are formed separately. As an alternative, the plunger rod 8 may be formed as an integrated portion of the plunger 10.

The plunger rod 8 and the plunger 10 (or the plunger 10 with the integrated plunger rod 8) form a brake force transmitting element of the brake booster.

Figure 4:
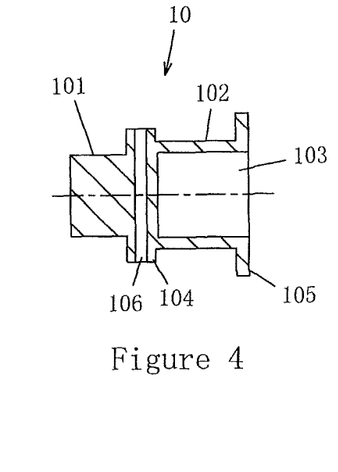
FIG. 4 is an enlarged sectional view of a plunger used in the brake booster shown in FIG. 1.

The structure of the plunger 10 is shown in more details in FIG. 4. As illustrated, the plunger 10 comprises a distal portion 101 and a proximal portion 102 integral therewith. The shape and the diametric dimension of the distal portion 101 are set so that it can be inserted into the middle through hole 60 of the valve body 6. The proximal portion 102 has a diametric dimension (for example, diameter) larger than that of the distal portion 101, and defines therein an accommodating space 103. The accommodating space 103 is opened at the proximal end surface of the plunger 10.

The proximal ends of the distal portion 101 and the proximal portion 102 are formed with outer periphery flanges 104 and 105 respectively. The shapes and the diametric dimensions of the outer periphery flanges 104 and 105 are set so that they can be disposed in the first accommodating socket 61 and the second accommodating socket 62 of the valve body 6 respectively in an axially movable manner.

A radial through hole 106 is formed through the outer periphery flange 104 for receiving the locating pin 108 (see FIG. 2) and fixing it therein. The locating pin 108 has diametrically opposite ends which are inserted into the through holes 66 of the valve body 6. Each through hole 66 has a certain axial length so that the opposite ends of the locating pin 108 can slide in the axial direction in the through holes 66.

A push bar 12 which is driven by the brake pedal (not shown) is inserted in the accommodating space 103. Specifically, the push bar 12 extends in the axial direction, having a central axis coincidence with the central axis of the plunger 10. The push bar 12 comprises a bar portion 12a and a front portion 12b in the form of a spherical head connected to the front end of the bar portion 12a. Further, a retention flange 12c is formed around or mounted to the outer periphery of the bar portion 12a.

The bar portion 12a of the push bar 12 is configured to be driven by the brake pedal so that the push bar 12 moves forwards in the axial direction. The spherical-head shaped front portion 12b of the push bar 12 biases forwards against an end wall formed in the accommodating space 103.

An insertion sleeve 14 is inserted in the back end of the valve body 6. The insertion sleeve 14 comprises a substantially cylindrical main body 14a configured to be inserted in the accommodating space 62 of the plunger 6, a front end flange 14b formed in the front end of the main body 14a and extending radially inwards, and a back end flange 14c formed at the back end of the main body 14a and extending radially outwards. The back end flange 14c is fixed to the back end of the valve body 6. The front end flange 14b is configured to be abutted against by the back end of the plunger 10.

Further, a returning spring 16 is disposed between the front end flange 14b and the retention flange 12c of the push bar 12. In this way, when the push bar 12 receives a pushing force from the brake pedal, the push bar 12 can move forwards against the spring force of the returning spring 16. When the pushing force from the brake pedal disappears, the push bar 12 moves backwards to its original position by the biasing effect of the spring force of the returning spring 16.

The distal end of the plunger rod 8 extends to a location proximal to the third step 63a in the valve body 6. A plunger plate 18 and a reaction plate 20 are disposed in the third accommodating socket 63 and the fourth accommodating socket 64 of the valve body 6 respectively.

The plunger plate 18 comprises a front body portion and a back pushing portion continuous therewith. The shape and the diametric dimension of the front body portion are set so that it is axially slidable in the third accommodating socket 63. The back pushing portion has a diametric dimension preferably smaller than that of the front body portion.

The shape and the diametric dimension the reaction plate 20 are set so that it is axially slidable in the fourth accommodating socket 64.

The plunger plate 18 is clamped in the axial direction between an inner portion of a proximal surface of the reaction plate 20 and the distal end of the plunger rod 8. An outer portion of the proximal surface of the reaction plate 20 is biased forwards by the fourth step 64a of the valve body 6.

A brake force outputting bar 22 is disposed in front of the reaction plate 20. The brake force outputting bar 22 comprises a back base portion and a front bar portion continuous therewith. The shape and the diametric dimension of the back base portion of the brake force outputting bar 22 correspond substantially to that of the reaction plate 20. The front bar portion of the brake force outputting bar 22 has a diametric dimension preferably smaller than that of the back base portion.

The front end surface of the reaction plate 20 biases forwards against the back base portion of the brake force outputting bar 22, and the front bar portion of the brake force outputting bar 22 is coupled to a primary piston 26 of a primary brake cylinder 24 of the vehicle brake system. The primary piston 26 has a central axis which is preferably coincidence with the central axis of the valve body 6, and the central axis of the whole brake booster is defined at least by the above mentioned two central axes.

The reaction plate 20 is preferably elastic, for example, formed by elastic rubber.

The brake force outputting bar 22 is clamped to the front end of the valve body 6 by a disc-like clamper 28. The clamper 28 comprises a front plate portion 28a, a sleeve portion 28b extending backwards in the axial direction from the outer periphery of the front plate portion 28a, and a back flange portion 28c extending outwards from the back end of the sleeve portion 28b. A central hole is formed through the front plate portion 28, and the front bar portion of the brake force outputting bar 22 passes through this central hole. The shape and the diametric dimension of the back flange portion 28c correspond substantially to that of the circular flange 65 of the valve body 6. Under the action of the returning spring 30 which is disposed between the front end surface of the housing 1 and the back flange portion 28c, the back flange portion 28c is biased against the front surface of the circular flange 65, and the front plate portion 28a is biased against the front surface of the back base portion of the brake force outputting bar 22. In this way, the brake force outputting bar 22 is clamped to the front end of the valve body 6, and the brake force outputting bar 22 in turn keeps the reaction plate 20 and the plunger plate 18 in the fourth accommodating socket 64 and the third accommodating socket 63 respectively.

The valve body 6 is axially movable with respect to the housing 1 under the guiding of the valve body guider 4. Specifically, the valve body 6 is able to move forwards when driven by the electric motor 32 (see FIGS. 2 and 3), and will move towards the proximal side under the action of the returning spring 30 when the driving action of the electric motor 32 disappears.

The electric motor 32 used in the disclosure can be selected from various rotation motors, for example, a DC rotation motor. Various possible transmission mechanisms can be used for converting the output rotational motion of the electric motor 32 into an axially forward displacement or a translational motion of the valve body 6. As an example, in the illustrated embodiment, the electric motor 32 is in the form of a rotation motor, and the transmission mechanism is in the form comprising a gear set 34 and a screw device 36. In this manner, the output rotational motion of the electric motor 32 is converted into an output forward linear motion by the gear set 34 and the screw device 36. As an alternative, other devices, like a worm and worm gear device, for converting a rotational motion into a linear motion can be used here.

Figure 7:
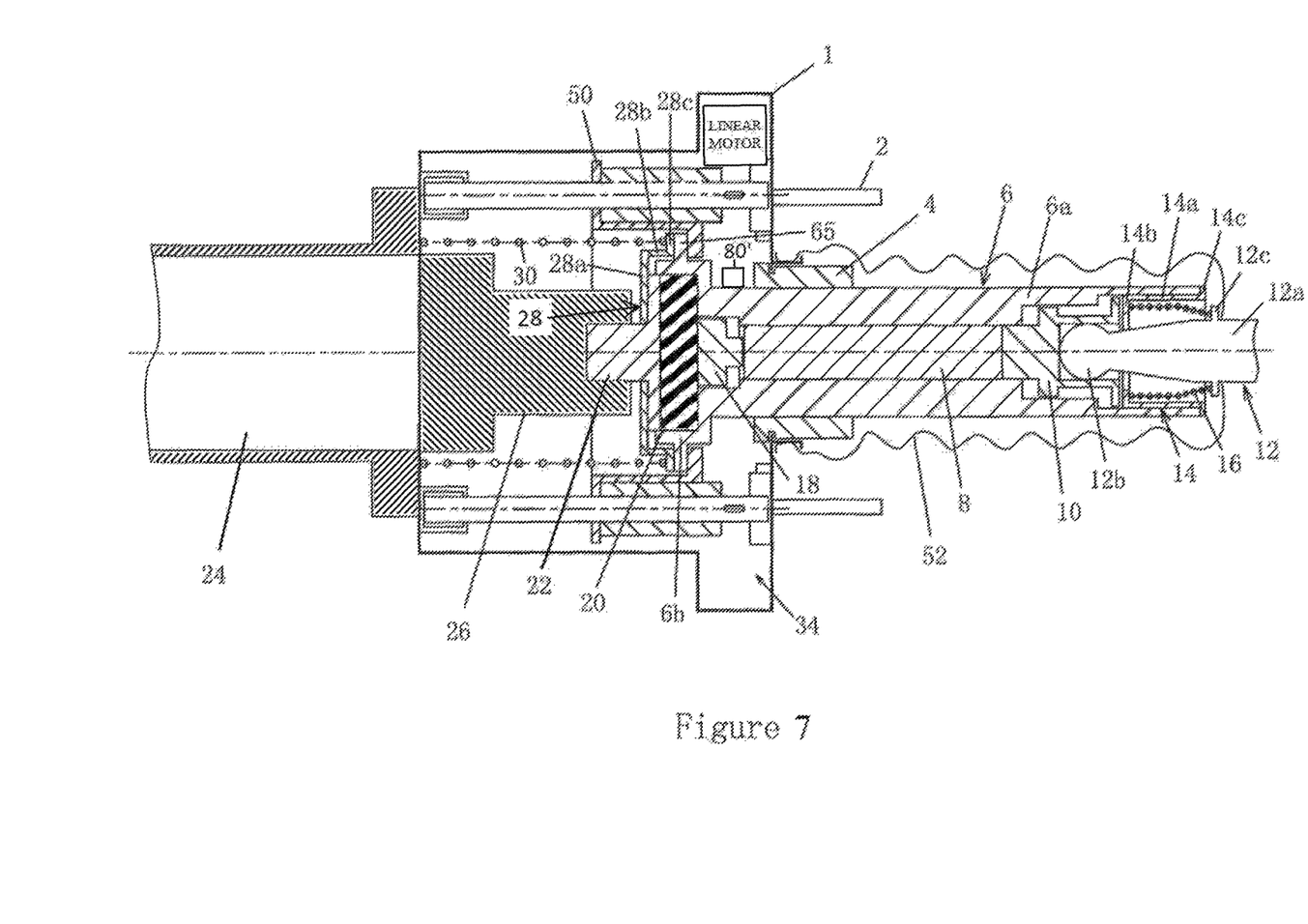
FIG. 7 is a sectional front view of a vehicle brake booster according to another possible embodiment of the disclosure.

Alternatively, the electric motor may be a linear motor, such as the DC linear motor 38 schematically depicted in FIG. 7. In the case that a linear motor is used, a corresponding transmission mechanism can be used to convert the output linear motion of the electric motor into an axially forward displacement of the valve body 6.

The output forward displacement of the transmission mechanism is transmitted to the valve body 6 via a transmitting tube 50 so that the valve body 6 moves forwards in the axial direction against the spring force of the returning spring 30.

The forward travel of the valve body 6 is limited, for example, not larger than the axial distance between the clamper 28 and the primary brake cylinder 24.

When the electric motor 32 rotates in a reverse direction, the valve body 6 can move backwards mainly under the action of the spring force of the returning spring 30 and an reaction force of the primary piston 26.

The plunger 10 is axially movable with respect to the valve body 6. Specifically, in an unbraking state of the brake booster as shown in FIGS. 1 and 2, the returning spring 30 biases the valve body 6 backwards via the back flange portion 28c of the clamper 28 so that the valve body 6 is kept in its original position. Meanwhile, the returning spring 30 biases the brake force outputting bar 22 backwards via the front plate portion 28a of the clamper 28 so that the plunger 10 is pushed to its most proximal position by the reaction plate 20, the plunger plate 18 and the plunger rod 8 in serial. In this position, the locating pin 108 is biased against the portions of the valve body 6 which define the proximal ends of the through holes 66, and the outer periphery flanges 104 and 105 of the plunger 10 are separate from the first and second steps 61a and 62a of the valve body 6 respectively. In this state, when the push bar 12 receives a pushing force from the brake pedal, the push bar 12 moves the plunger 10 forwards, and then the outer periphery flange 104 engages the first step 61a and/or the outer periphery flange 105 engages the second step 62a and/or the locating pin 108 engages the portions of the valve body 6 which define the distal ends of the through holes 66. Then, the push bar 12 pushes the valve body 6 forwards via the plunger 10. When the pushing force from the brake pedal disappears, the plunger 10 moves backwards under the actions of the returning spring 30 and the primary piston 26 to return to its original position.

The brake booster may comprise a sealing sleeve 52, for example, a rubble sealing sleeve, for protecting the functional components of the brake booster which are exposed outside the housing 1, in particular, the valve body 6.

The brake booster further comprises an electronic control unit for detecting the positions of the plunger 10 and the valve body 6 and then controlling the operation of the electric motor 32 based on the detection.

Specifically, the brake booster is in an unbraking position in FIGS. 1 and 2, that is to say, the driver does not step down the brake pedal. Now there is no brake force applied to the primary piston 26 of the primary brake cylinder 24.

Then, when the driver steps down the brake pedal to perform vehicle braking, the downward motion of the brake pedal results in axially forward moving of the push bar 12 against the pushing force of the returning spring 16. The front portion 12b of the push bar 12 pushes the plunger 10 and the plunger rod 8 to move forwards, and the distal end of the plunger rod 8 pushes the inner portion of the reaction plate 20 forwards via the plunger plate 18 so that the inner portion of the reaction plate 20 urges the primary piston 26 of the primary brake cylinder via the brake force outputting bar 22. In this way, the pedal brake force (the driver's brake force) applied by the driver is transmitted to the primary piston 26.

In an initial stage of the forward displacement of the plunger 10, the valve body 6 keeps stationary in the axial direction under the backward pushing action of the returning spring 30. In this stage, the electronic control unit detects that the plunger 10 moves axially forwards while the axial position of the valve body 6 is unchanged. In this condition, the electronic control unit judges out the braking intention of the driver on the basis of respective positions of the valve body 6 and the plunger 10 and the positional difference between them. Then, the electronic control unit instructs the electric motor 32 to run in a forward direction, and the output forward rotation of the electric motor 32 is transmitted to the valve body 6 by the transmission mechanism so that the valve body 6 is driven to move forwards against the pushing force of the returning spring 30. The fourth step 64a of the valve body 6 urges the outer portion of the reaction plate 20 forwards so that the outer portion of the reaction plate 20 pushes the primary piston 26 of the primary brake cylinder forwards via the brake force outputting bar 22. In this way, a booster brake force provided by the electric motor 32 is transmitted to the primary piston 26.

It can be seen that the brake force outputting bar 22 forms a brake force outputting element for transmitting the pedal brake force and the booster brake force to the primary piston of the primary brake cylinder. It is appreciated that other forms of the brake force outputting element can also be used here.

Under the action of the pedal brake force applied by the driver and the booster brake force provided by the electric motor, the primary piston 26 force the brake fluid accommodated in the primary brake cylinder to be supplied to the brake devices for the vehicle wheels to conduct braking to the vehicle. Now the brake booster is in the braking position. The electronic control unit judges out the continuation of the braking action based on respective positions of the valve body 6 and the plunger 10, and keeps the electric motor 32 to run in the forward direction; alternatively, the electric motor 32 may stop after is has run in the forward direction for a period of time to wait the ending of the braking action.

When the driver decides to end the braking action, he/she will release the brake pedal. A hydraulic force applied to the primary piston 26 from the primary brake cylinder acts on the plunger 10 in the backward direction via the brake force outputting bar 22, the inner portion of the reaction plate 20, the plunger plate 18 and the plunger rod 8 so that the plunger 10 moves backwards to its original position shown in FIGS. 1 and 2. When the brake booster is in an intermediate position in the backward transitional travel from its braking position towards its unbraking position, the electronic control unit detects the state that the plunger 10 is moving axially backwards while the axial position of the valve body 6 remains unchanged or the valve body 6 moves backwards slower than the plunger 10. Now the electronic control unit judges out the brake releasing intention of the driver on the basis of respective positions of the valve body 6 and the plunger 10 and the positional difference between them. Then, the electronic control unit instructs the electric motor 32 to run reversely, and the valve body 6 is forced to move backwards under the pushing forces of the returning spring 30 and the primary piston 2. Ultimately, the valve body 6 returns to its original position in the unbraking state. The electronic control unit judges out the ending of the brake releasing (or removing) action, and then stops the reverse running of the electric motor 32.

No matter in the braking operation or in the brake releasing operation, the plunger 10 always moves a small distance in the axial direction with respect to the valve body 6 first, then the electronic control unit controls the electric motor 32 to rotate forwardly or reversely. For controlling the activating of the electric motor 32, it needs to detect respective axial positions of the plunger 10 and the valve body 6 (and the difference in the axial positions of them). Further, during the forward or reverse rotation of the electric motor 32, it may also need to detect the axial positions of the plunger 10 and the valve body 6 for determining the rotational speed of the electric motor 32. Thus, for accurately controlling the activating and running of the electric motor 32, the axial positions and speeds of the plunger 10 and the valve body 6 shall be detected with high precision.

For this purpose, according to the disclosure, rotation sensors are provided for detecting the axial positions of the plunger 10 and the valve body 6.

The electric motor 32 comprises therein a rotor rotation sensor 33 for monitoring the motion of the electric motor 32. Thus, the rotor rotation sensor 33 in the electric motor 32 can be used for detecting the axial position of the valve body 6.

Figure 3:
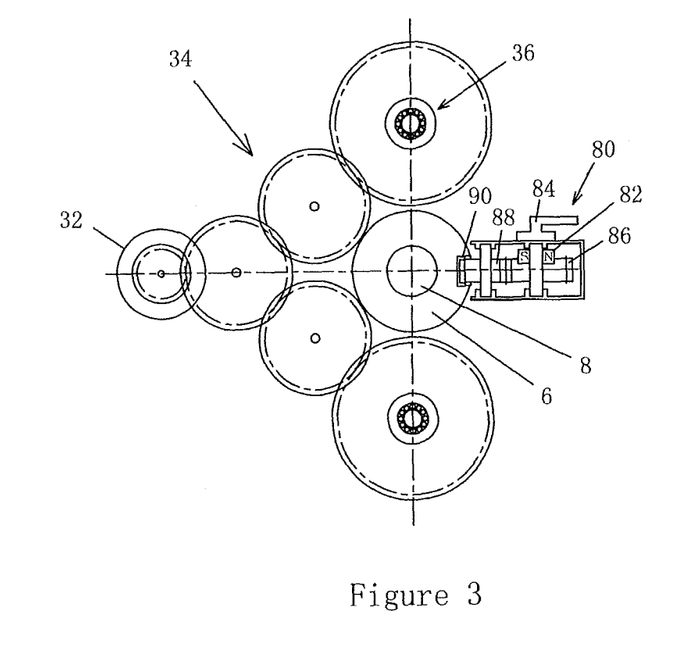
FIG. 3 is a sectional side view of a transmission mechanism of the brake booster shown in FIG. 1.

For detecting the axial position of the plunger 10, a specific rotation sensor 80, as shown clearly in FIG. 3, is provided in the disclosure. The rotation sensor 80 mainly comprises a sensor magnet 82 and a sensing element 84 for sensing the change in the magnetic field of the magnet 82. The sensor magnet 82 is mounted to a sensor gear 86, the sensor gear 86 meshes with a free gear wheel 88, and the free gear wheel 88 in turn meshes with a toothed rack 90.

Figure 6:
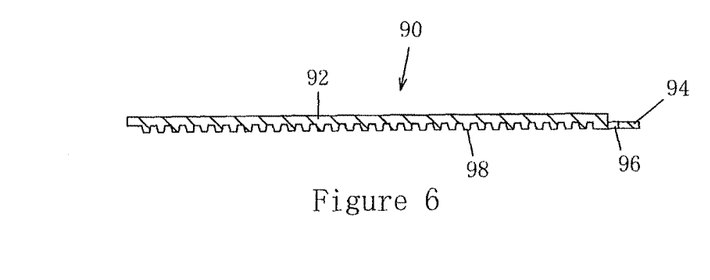
FIG. 6 is an enlarged sectional view of a toothed rack used in the brake booster shown in FIG. 1.

As shown in FIG. 6, the toothed rack 90 comprises a main portion 92 and a handle portion 94 continuous with the back end of the main portion 92. A fixing hole 96 is formed in the handle portion 94 and is configured to be inserted through by an end of the locating pin 108. The main portion 92 is formed with teeth 98 to be engaged with corresponding teeth of the free gear wheel 88.

The toothed rack 90 is disposed in the rack receiving socket 67 of the valve body 6 in an axially movable manner. When the plunger 10 moves in the axial direction, the locating pin 108 on the plunger 10 drives the toothed rack 90 to move in the axial direction synchronously. The toothed rack 90 moving in the axial direction drives the sensor gear 86 via the free gear wheel 88. As the sensor gear 86 rotates, the magnet 82 carried by the sensor gear 86 rotates therewith, and the change in the magnetic field of the magnet 82 is sensed by the sensing element 84, and thus the rotational position of the sensor gear 86 is determined. Then, the axial position of the toothed rack 90, also of the plunger 10, can be calculated out based on the transmission ratio between the toothed rack 90 and the sensor gear 86.

It is appreciated that other forms of the motion converting mechanism which can convert the axial movement, i.e., the translational motion, of the plunger 10 into a rotational motion detectable by the rotation sensor can also be used here.

It is noted that some embodiments of the disclosure in which the electric motor is used to provide the booster brake force are described here, so the brake booster described above can be referred to as an electric brake booster. However, it is appreciated that the basic concept of the disclosure is also applicable in embodiments in which the booster brake force is provided by other types of power sources.

The rotation sensors used in the disclosure may make use of matured technology in the art of sensors (for example, rotation sensors in brushless motors), and they are not described here in more details.

Comparing with the stroke sensor used in the prior art, a rotation sensor is used in the disclosure for detecting the position of the plunger 10. The rotation sensor has a resolution ratio much higher than that of the stroke sensor, and thus the detection precision of the axial position of the plunger 10 can be increased.

Further, comparing with the stroke sensor, the rotation sensor is less affected by the direction and intensity of a magnetic field, and thus the rotation sensors can provide higher signal stability.

Further, the performance of a stroke sensor will be degenerated when it is contaminated with outside materials, like dust, oil and ice; as a comparison, when a rotation sensor is contaminated with outside materials, its performance is not degenerated as severely as the stroke sensor. Thus, the rotation sensor has high robustness.

Further, a rotation sensor does not include a large, expensive magnet like that used in a stroke sensor, and thus has lower cost. In addition, all of the toothed rack 90, the sensor gear 86 and the free gear wheel 88 may be formed of plastic, the cost of which is relative low, which contributes to reduction of the overall cost of the brake booster. Further, these plastic parts are light weighted and do not create large inertial forces, and thus they do not significant affect the operation of the brake booster.

It shall be noted that, as an addition or alternative to the rotor-rotation sensor of the electric motor 32, a rotation sensor 80' (FIG. 7) similar to the rotation sensor 80 described above can be used for detecting the axial position of the valve body 6.

Further, according to the disclosure, even if the electric motor 32 stops to operate due to malfunction of the electronic control unit, the axially forward movement of the valve body 6 is not obstructed in any sense by the transmission mechanism; thus, the brake force applied by the driver via the brake pedal can still be transmitted to the primary piston 26 of the primary brake cylinder 24. Specifically, in this condition, the brake pedal pushes the plunger 10 forwards via the push bar 12 first. Then, the plunger 10 comes into contact with the valve body 6 and drives the valve body 6 to move forwards together in the axial direction. In this way, the brake force applied by the driver via the brake pedal is transmitted to the reaction plate 20 via the plunger 10 and the valve body 6, and then transmitted therefrom to the primary piston 26. Thus, even if the electronic control unit has some problems, vehicle braking can be performed by the action of the driver stepping down the brake pedal.

It can be seen that, according to the disclosure, a rotation sensor is used to detect the axial positions of the plunger 10 and the valve body 6 so that the axial positions of them can be measured with high precision. As a result, the running time, running direction, running speed and the like of the electric motor can be actively controlled accurately, and thus the action of the brake booster can be controlled in real time with high precision.

The brake booster of the disclosure is applicable in vehicles having various power sources, like fuel vehicles, gas vehicles, electric vehicle, hybrid vehicles, etc.

Although the disclosure is illustrated and described here with reference to specific embodiments, the disclosure is not intended to be limited to the details shown. Rather, various modifications may be made to the details within the scope of the disclosure.

The invention claimed is:

1. A brake booster for a vehicle brake system, comprising:
a brake force transmitting element configured to be moveable in an axial direction so as to transmit a pedal brake force from a brake pedal to a primary brake cylinder of the vehicle;
a booster force transmitting element configured to be moveable in the axial direction so as to transmit a booster brake force generated by an electric motor to the primary brake cylinder;
a first rotation sensor kinematically coupled with the brake force transmitting element via a motion converting mechanism and configured to measure the axial position of the brake force transmitting element, the motion converting mechanism being configured to convert a translational motion into a rotational motion; and
a second rotation sensor kinematically coupled with the booster force transmitting element and configured to measure the axial position of the booster force transmitting element,
wherein the measurements of the first and second sensors are used to control the generation of the booster brake force,
wherein the motion converting mechanism is configured to cooperate in an axially movable manner with an outer peripheral surface of the booster force transmitting element, and
wherein the outer peripheral surface of the booster force transmitting element defines a socket that extends in the axial direction, and the motion converting mechanism is disposed in the socket.

2. The brake booster of claim 1, wherein the electric motor drives the booster force transmitting element via a transmission mechanism.

3. The brake booster of claim 2, wherein:
the electric motor is configured as a rotation motor,
the second sensor is configured as a rotor-rotation sensor of the electric motor, and
the transmission mechanism is configured to convert a rotational motion into a translational motion.

4. The brake booster of claim 1, further comprising an electronic control unit that controls the generation of the booster brake force based on the measurements of the first and second rotation sensors by controlling the operation of the electric motor.

5. The brake booster of claim 1, wherein the motion converting mechanism comprises:
a toothed rack coupled with the brake force transmitting element in such a way so as to move in the axial direction together with the brake force transmitting element; and
a sensor gear configured to be driven by the toothed rack to generate a rotational motion that is configured to be sensed by the first rotation sensor,
wherein the toothed rack is carried by the booster force transmitting element and is configured to move in the axial direction with respect to the booster force transmitting element.

6. The brake booster of claim 5, wherein the first rotation sensor comprises a sensor magnet carried by the sensor gear and a sensing element that is configured to sense the change in the magnetic field of the sensor magnet.

7. The brake booster of claim 1, wherein the booster force transmitting element comprises a hollow valve body extending in the axial direction, and wherein the brake force transmitting element comprises a plunger to be driven forwards by the brake pedal via a push bar, the plunger being configured to be axially movable in the valve body.

8. The brake booster of claim 1, wherein the brake force transmitting element is coupled with the motion converting mechanism by a locating pin.

9. The brake booster of claim 8, wherein the locating pin is configured to move a limited distance in the axial direction with respect to the booster force transmitting element.

10. The brake booster of claim 1, further comprising a brake force outputting element configured to transmit the pedal brake force and the booster brake force to a primary piston of the primary brake cylinder.

11. The brake booster of claim 1, further comprising a returning element configured to apply a returning force to the booster force transmitting element, the booster force transmitting element tending to move backwards in the axial direction under the action of the returning element.

12. The brake booster of claim 11, wherein the returning element is configured as a returning spring.

13. A brake booster for a vehicle brake system, comprising:
a brake force transmitting element configured to be moveable in an axial direction so as to transmit a pedal brake force from a brake pedal to a primary brake cylinder of the vehicle;
a booster force transmitting element configured to be moveable in the axial direction so as to transmit a booster brake force generated by an electric motor to the primary brake cylinder;
a first rotation sensor kinematically coupled with the brake force transmitting element via a motion converting mechanism and configured to measure the axial position of the brake force transmitting element, the motion converting mechanism being configured to convert a translational motion into a rotational motion; and
a second rotation sensor kinematically coupled with the booster force transmitting element and configured to measure the axial position of the booster force transmitting element, wherein the measurements of the first and second sensors are used to control the generation of the booster brake force, wherein the motion converting mechanism is configured to cooperate in an axially movable manner with an outer peripheral surface of the booster force transmitting element, and wherein the brake force transmitting element defines a radial through hole, and wherein the booster force transmitting element defines opposed through holes, the brake booster further including a locating pin secured in the radial through hole and extending bilaterally into the opposed through holes.

14. A brake booster for a vehicle brake system, comprising:
- a brake force transmitting element configured to be moveable in an axial direction so as to transmit a pedal brake force from a brake pedal to a primary brake cylinder of the vehicle;
- a booster force transmitting element configured to be moveable in the axial direction so as to transmit a booster brake force generated by an electric motor to the primary brake cylinder;
- a first rotation sensor kinematically coupled with the brake force transmitting element via a motion converting mechanism and configured to measure the axial position of the brake force transmitting element, the motion converting mechanism being configured to convert a translational motion into a rotational motion; and
- a second rotation sensor kinematically coupled with the booster force transmitting element and configured to measure the axial position of the booster force transmitting element, wherein the measurements of the first and second sensors are used to control the generation of the booster brake force, wherein the motion converting mechanism comprises (i) a toothed rack coupled with the brake force transmitting element in such a way so as to move in the axial direction together with the brake force transmitting element and (ii) a sensor gear configured to be driven by the toothed rack to generate a rotational motion that is configured to be sensed by the first rotation sensor, and wherein the toothed rack is carried by the booster force transmitting element and is configured to move in the axial direction with respect to the booster force transmitting element.

15. The brake booster of claim 13, wherein:
the radial through hole is configured to accept the locating pin and secure the locating pin therein, and
the opposed through holes are axially larger than the locating pin so that the locating pin is configured to move a limited distance in the axial direction with respect to the booster force transmitting element.

* * * * *